(12) United States Patent
de Graauw et al.

(10) Patent No.: US 9,329,259 B2
(45) Date of Patent: May 3, 2016

(54) CONCURRENT MULTIBAND TRANSCEIVER

(71) Applicant: NXP B.V., Eindhoven (NL)

(72) Inventors: Antonius de Graauw, Haelen (NL); Markus van Schie, Haarlem (NL)

(73) Assignee: NXP B.V., Eindhoven (NL)

( * ) Notice: Subject to any disclaimer, the term of this patent is extended or adjusted under 35 U.S.C. 154(b) by 378 days.

(21) Appl. No.: 14/097,073

(22) Filed: Dec. 4, 2013

(65) Prior Publication Data

US 2014/0159935 A1 Jun. 12, 2014

(30) Foreign Application Priority Data

Dec. 5, 2012 (EP) .................................. 12195634

(51) Int. Cl.
| | |
|---|---|
| *G01S 7/03* | (2006.01) |
| *G01S 7/00* | (2006.01) |
| *G01S 13/93* | (2006.01) |
| *H04B 1/00* | (2006.01) |
| *H04B 1/18* | (2006.01) |
| *H04B 1/04* | (2006.01) |
| *H04B 1/38* | (2015.01) |
| *H04B 1/3822* | (2015.01) |

(52) U.S. Cl.
CPC ............... *G01S 7/03* (2013.01); *H04B 1/0053* (2013.01); *H04B 1/0064* (2013.01); *H04B 1/18* (2013.01); *G01S 7/006* (2013.01); *G01S 13/931* (2013.01); *H04B 1/0483* (2013.01); *H04B 1/3822* (2013.01)

(58) Field of Classification Search
CPC ......... G01S 7/03; G01S 7/006; G01S 13/931; H04B 1/0053; H04B 1/80064; H04B 1/18; H04B 1/0458; H04B 1/0483; H04B 1/3822; H04B 1/50

USPC .............................................. 342/21, 70, 175
See application file for complete search history.

(56) References Cited

U.S. PATENT DOCUMENTS 3,740,748 A * 6/1973 Hose .................. G01S 13/53
    342/104
6,658,265 B1 * 12/2003 Steel ................... H03F 3/191
    455/552.1

(Continued)

FOREIGN PATENT DOCUMENTS

| CN | 1868132 A | 11/2006 |
|---|---|---|
| CN | 101971492 A | 2/2011 |

(Continued)

OTHER PUBLICATIONS

Meharry, D. E. et al. "Broad Bandwidth Transformer Coupled Differential Amplifiers for High Dynamic Range", IEEE Journal of Solid-State Circuits, vol. 34, No. 9, p. 1233-1238 (Sep. 1999).

(Continued)

*Primary Examiner* — Peter Bythrow
(74) *Attorney, Agent, or Firm* — Rajeev Madnawat

(57) ABSTRACT

The invention refers to an RF front-end (100) adapted to receive or transmit signals located in at least two separated frequency bands (100) comprising an input and an output and further comprising
  a first phase shifter (5) coupled to the input of the RF front-end (100);
  a second phase shifter (6) coupled to the output of the RF front-end (100);
  the first phase shifter (1) being coupled to the second phase shifter (2) via a first amplifier (3) and second amplifier (4), respectively.

19 Claims, 4 Drawing Sheets

(56) References Cited

U.S. PATENT DOCUMENTS

| | | | |
|---|---|---|---|
| 6,917,815 B2* | 7/2005 | Hajimiri | H04B 1/005 455/285 |
| 6,990,357 B2* | 1/2006 | Ella | H04B 1/0057 455/552.1 |
| 7,844,231 B2* | 11/2010 | Yoon | H04B 1/525 342/374 |
| 8,816,794 B2* | 8/2014 | Sako | H01Q 1/242 333/126 |
| 8,824,975 B2 | 9/2014 | Sato et al. | |
| 2003/0003952 A1* | 1/2003 | Kim | H04B 1/005 455/552.1 |
| 2005/0003771 A1* | 1/2005 | De Ruijter | H01Q 7/005 455/127.1 |
| 2007/0142014 A1 | 6/2007 | Wilcox | |
| 2007/0155350 A1 | 7/2007 | Razavi et al. | |
| 2009/0081965 A1* | 3/2009 | Erceg | H01Q 9/16 455/90.2 |
| 2009/0251362 A1* | 10/2009 | Margomenos | G01S 7/032 342/175 |
| 2011/0279184 A1* | 11/2011 | Chan | H03F 1/525 330/295 |
| 2011/0299431 A1* | 12/2011 | Mikhemar | H04B 1/18 370/277 |
| 2014/0159935 A1 | 6/2014 | De Graauw et al. | |

FOREIGN PATENT DOCUMENTS

| | | |
|---|---|---|
| CN | 102096079 A | 6/2011 |
| CN | 102414996 A | 4/2012 |
| WO | 2011/026522 A1 | 3/2011 |

OTHER PUBLICATIONS

Taghian, F. et al. "Design and Nonlinear Analysis of a Dual-Band Doherty Power Amplifier for ISM and LMDS Applications", IEEE Applied Electromagnetics Conference, 4 pgs (Dec. 2011).

Extended European Search Report for Patent Appln. No. 12195634.6 (Jun. 6, 2013).

Ryynanen, J. et al. "Integrated Circuits for Multi-Band Multi-Mode Receivers", IEEE Circuits and System Magazine, 12 pgs (2006).

Fukuda, A. et al. "A High Power and Highly Efficient Multi-band Power Amplifier for Mobile Terminals", IEEE Radio and Wireless Symposium, pp. 45-48 (Jan. 2010).

Wu, Chong-Ru et al. "A 3-5 GHz Frequency-Tunable Receiver Frontend for Multiband Applications", IEEE Microwave and Wireless Components Letters, vol. 18, No. 9, p. 638-640 (Sep. 2008).

Extended European Search Report for Patent Appln. No. 12195647.8 (Jun. 28, 2013).

* cited by examiner

CONCURRENT MULTIBAND TRANSCEIVER

CROSS-REFERENCE TO RELATED APPLICATIONS

This application claims the priority under 35 U.S.C. §119 of European patent application no. 12195634.6, filed on Dec. 5, 2012, the contents of which are incorporated by reference herein.

FIELD OF THE INVENTION

The invention relates to a concurrent multiband receiver or transmitter or transceiver adapted to receive and/or transmit signals in more than one frequency band simultaneously.

BACKGROUND OF THE INVENTION

Modern transmitters and receivers are often required to be able to operate in different frequency bands. This can be done using different solutions.

A first possibility is to use parallel transmitters or receivers where each transmitter/receiver is used for a specific frequency band. This is a costly solution in terms of component count, area and power consumption.

Another possibility is to use tunable elements in the transmitter or receiver, the elements being tuned for specific frequency bands. The tunable elements can use e.g. varactors, such that the transmitter or receiver can be tuned for operation in different frequency bands as it is shown by Chong-Ru Wu et al., "A 3-5 GHz Frequency-Tunable Receiver Frontend for Multiband Applications", in IEEE MICROWAVE AND WIRELESS COMPONENTS LETTERS, VOL. 18, NO. 9, SEPTEMBER 2008. This solution requires expensive tunable components and additional digital circuitry for tuning the circuits to the correct frequency.

Yet another alternative, which is often used to support multiband operation, is to switch between different frequency bands as it is shown by Atsushi Fukuda et al. "A High Power and Highly Efficient Multi-band Power Amplifier for Mobile Terminals" in 2010 IEEE Radio and Wireless Symposium conference publications pages 45-48. This can be done with capacitor banks and switches, or even by switching between complete matching networks. Using this alternative, additional circuitry is necessary for implementing the multiband operation.

In another alternative, one may use wideband circuits in the transmitter or receiver. However, the maximum bandwidth of practical building blocks is naturally limited. Apart from this, for a wideband receiver there is the disadvantage of being sensitive to unwanted sources that fall within the receiver bandwidth. In a similar way, a wideband transmitter will amplify unwanted input signals that fall within the transmitter bandwidth.

All the previously presented alternative solutions, excepting the last one, have in common that the transmitter or receiver are capable of transmitting or receiving in only one frequency band at a time, reducing the throughput of the system as it is shown by Jussi Ryynanen et al., "Integrated Circuits for Multi-Band Multi-Mode Receivers" in the Special Issue on Wireless Reconfigurable Terminals—Part II, IEEE Circuits and Systems Magazine, second quarter 2006.

Other alternative solutions are known from e.g. U.S. Pat. No. 6,658,265 and U.S. Pat. No. 6,917,815.

U.S. Pat. No. 6,658,265 discloses a dual mode amplifier capable of operating in a common mode for one frequency band and a differential mode for a second frequency band. In the common mode, the amplifier provides two identical signals to a matching network, and in the differential mode, the amplifier provides two signals that are 180° out of phase from one another to the matching network. The matching network is configured to maintain the same input and output impedance regardless of whether the amplifier is operating in the common mode or differential mode. Since the matching network operates on two signals, either common or differential, a power combining network is typically required to combine the two signals into a single signal for transmission. It is observed that the system does not support concurrent multiband operation.

U.S. Pat. No. 6,917,815 discloses an architecture for a concurrent dual band high-frequency receiver. It combines a concurrent dual-band front-end subsystem having a dual-band antenna, dual band pre-amplifier filter and concurrent dual-band LNA with an image rejection downconverter to provide the functions of a typical receiver, including reception, amplification and downconversion of a signal in two discrete desired frequency bands simultaneously. The stem disclosed here is a concurrent dualband receiver architecture but it doesn't make use of simultaneous common mode and differential mode operation.

It is therefore a need to obtain a front-end that works concurrently and provides both differential and common mode of operation with the advantage of reducing the costs and the footprint of the circuits.

SUMMARY OF THE INVENTION

Hence, it is a need, to obtain a front-end that works in multiple frequency bands with reduced cost and footprint.

It is therefore an object of the invention to provide an RF front-end adapted to receive or transmit signals located in at least two separated frequency bands comprising an input and an output and further comprising a first phase shifter coupled to the input of the RF front-end (100), a second phase shifter coupled to the output of the RF front-end, the first phase shifter being coupled to the second phase shifter via a first amplifier and second amplifier, respectively.

The invention is defined by the independent claim. Dependent claims define advantageous embodiments.

The RF front-end may further comprise an input matching circuit including a first input coupled to the input of the RF front-end and a second input coupled to the first phase shifter, the first matching circuit further comprising a first output coupled to an input of the first amplifier circuit and a second output coupled to an input of the second amplifier circuit. The RF front-end, may also comprise an output matching circuit including a third input coupled to an output of the first amplifier circuit, and a fourth input coupled to an output of the second amplifier circuit.

In an embodiment, the first phase shifter has the same structure as the second phase shifter. The input matching circuit may have the same structure as the output matching circuit. Both the above features simplify the design of the circuit.

The first phase shifter and the second phase shifter each comprises a delay line or a lumped passive or active filter. The choice would be dependent on the frequency range of the input signals. For lower frequencies lumped solutions might be more suitable for implementation. For higher frequencies situated in GHz range or mm range i.e. tenths or hundreds of GHz a delay line might be more suitable.

The first phase shifter and the second phase shifter each provides at their respective outputs an odd multiple of 180° phase shift of a signal situated in a first frequency band applied to their respective inputs.

The first phase shifter and the second phase shifter each provides at their respective outputs an even multiple of 180° phase shift of a signal situated in a second frequency band applied to their respective inputs.

The input matching circuit comprises a T filter comprising inductors. The output matching circuit (2) comprises a T filter comprising inductors. Preferably, both circuits would have the same topology and probably the easiest implementation is achieved using inductors. However, it is not necessary that both circuits are identical. The choice would depend on the application where the circuit is used.

The input matching effectuates impedance-matching between the source impedance and the common-mode input impedance of the combined amplifiers in the first frequency band, and between the source impedance and the differential mode input impedance of the combined amplifiers in the second frequency band.

The output matching circuit provides a similar role for the output stage.

The first amplifier and the second amplifier are single-ended or differential amplifiers. The first amplifier and the second amplifier might be transconductance amplifiers. In the very simple form the amplifiers could be a transistor made in any technology as e.g. bipolar, GaAs or, in general, a III-V compound, CMOS etc. However, depending on the application the amplifiers may be transimpedance amplifier and more general any type of controlled sources.

In applications as radar, high frequency communications as car to car communication using IEEE 802.11/p standard or a combination thereof it is preferable to have a transmitter comprising a signal combiner coupled to an RF front-end as described above in any of the embodiments, the RF front-end being coupled to a signal splitter, the signal splitter being coupled to either a pair of single band antennae, or to a dual band antenna.

In the above application it is preferable to have a receiver comprising a signal combiner coupled to an RF front-end as described above, the RF front-end being coupled to a signal splitter, the signal combiner being coupled to either a pair of single band antenna, or to a dual band antenna.

In an embodiment of the invention the communication devices are mounted on a vehicle as a car.

BRIEF DESCRIPTION OF THE DRAWINGS

The above and other advantages will be apparent from the exemplary description of the accompanying drawings in which.

DETAILED DESCRIPTION OF EMBODIMENTS

Figure 1:
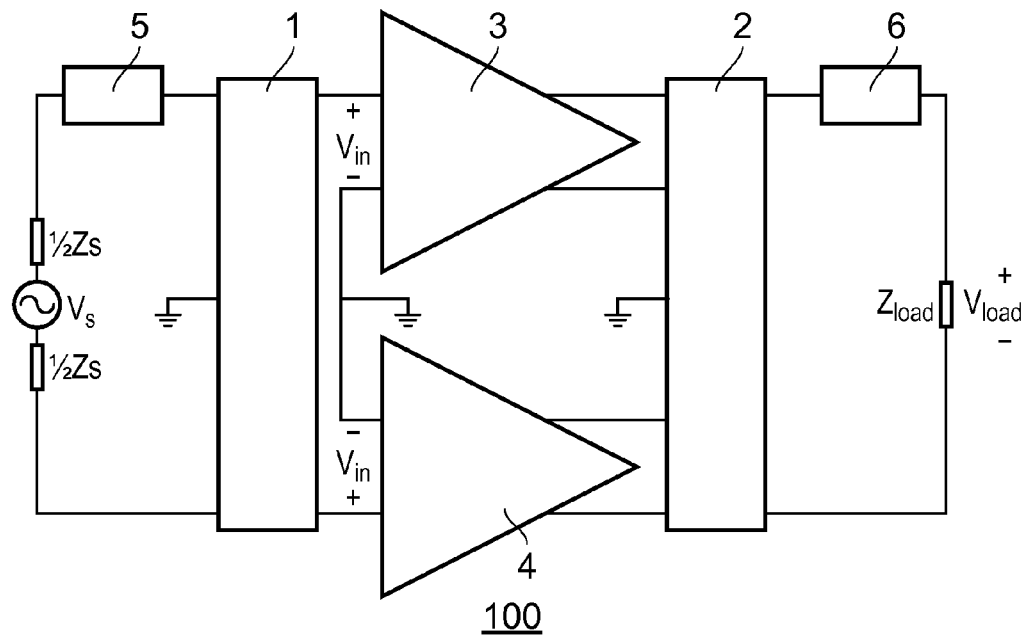
FIG. 1 depicts an RF front-end according to the invention.

FIG. 1 depicts an RF front-end according to the invention. The RF front-end (100) is adapted to receive or transmit signals located in at least two separated frequency bands comprising an input and an output and further comprising a first phase shifter (5) coupled to the input of the RF front-end (100). It further comprises a second phase shifter (6) coupled to the output of the RF front-end (100), the first phase shifter (5) being coupled to the second phase shifter (6) via a first amplifier (3) and second amplifier (4), respectively.

The RF front-end (100) further comprising an input matching circuit (1) comprising a first input coupled to the input of the RF front-end (100) and a second input coupled to the first phase shifter (5), the first matching circuit (1) further comprising a first output coupled to an input of the first amplifier circuit (3) and a second output coupled to an input of the second amplifier circuit (4). The RF front-end (100) further comprises an output matching circuit (2) comprising a third input coupled to an output of the first amplifier circuit (4), and a fourth input coupled to an output of the second amplifier circuit (4). Preferable, the first phase shifter (5) has the same structure as the second phase shifter (6), but this not necessary to be in practice. That means that the topology of the respective circuits may be identical, but not necessary the values of the respective devices used therein.

The current invention is capable of providing amplification of signals in multiple frequency bands, without the need of switches or tunable components. The RF front-end can be designed such that amplification is provided in multiple frequency bands with a high degree of freedom in positioning the different operating frequencies. Also, with the present invention, simultaneous operation in different bands is supported. This, for example, enables the design of a multi-band receiver/transmitter in which a single low noise amplifier (LNA) is used to simultaneously amplify signals in different telecommunication bands. A second example can be a base station power amplifier which is used to simultaneously amplify two different bands, leading to higher system efficiency and lower hardware costs. Yet another example could be the use in radar systems.

The phase shift of the phase shifters (5,6) is dependent on frequency. For a frequency $f_{0\_cm}$ the phase shift of the phase shifter (5) at the input and the output (6) is an odd multiple of 180 degrees. For this frequency therefore, the amplifier input voltages in both branches at the input reference plane are in-phase, causing the differential amplifier achieved with the first and second amplifiers (3,4) to operate in common mode. For this frequency also the output voltages at the output voltage reference plane are in phase. The phase shifter at the output (6) has a 180 degrees phase shift at this frequency, causing a differential voltage across the load impedance. For a frequency $f_{0\_dm}$, the phase shift of the phase shifters at the input (5) and output (6) is an even multiple of 180 degrees. For this frequency therefore the input voltages at the input reference plane are 180 degrees out of phase, and the amplifier formed by the first and second amplifier (3,4) operates in differential mode. At this frequency the voltages at the output reference plane also have a 180 degrees phase difference and the phase shifter at the output has an insertion phase being an even multiple of 180 degrees, such that the voltage across the load has a differential component only.

It is observed that the amplifier can operate simultaneously in multiple bands, even if it does not include tunables devices or switches. Effectively this means that the differential source signal is converted to a common and differential mode signal for different frequency bands by the input matching network (1) and phase shifter (5), then it is amplified in common and differential mode by the amplifier and then converted to a differential output signal across the load by the output matching network (2) and the phase shifter at the output (6).

If the phase shifters (5,6) are implemented such that the insertion phase is an odd multiple of 180 degrees at different frequencies, common-mode amplification is possible at the same frequencies, provided that the amplifier is impedance matched at these frequencies for the common mode. This can be done by designing the input and output matching networks (1,2) to provide the correct common-mode impedance transformations at these frequencies.

If the phase shifters (5,6) have an insertion phase being an even multiple of 180 degrees at different frequencies, the amplifier can provide gain in differential-mode at these same frequencies, provided that the differential input and output impedances are impedance matched by the matching networks at these frequencies.

Figure 2:
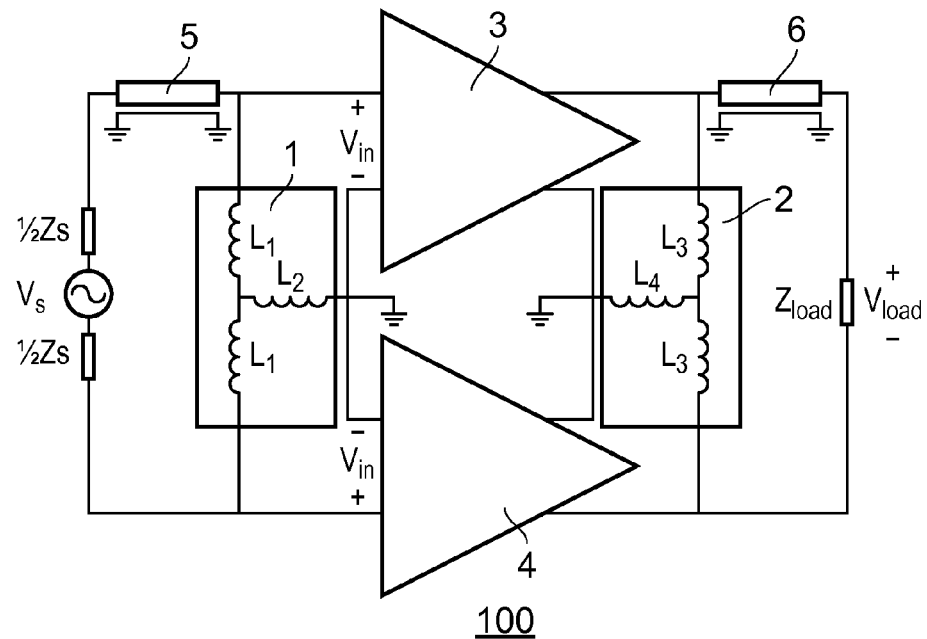
FIG. 2 depicts an RF front-end in more detail.
Figure 3:
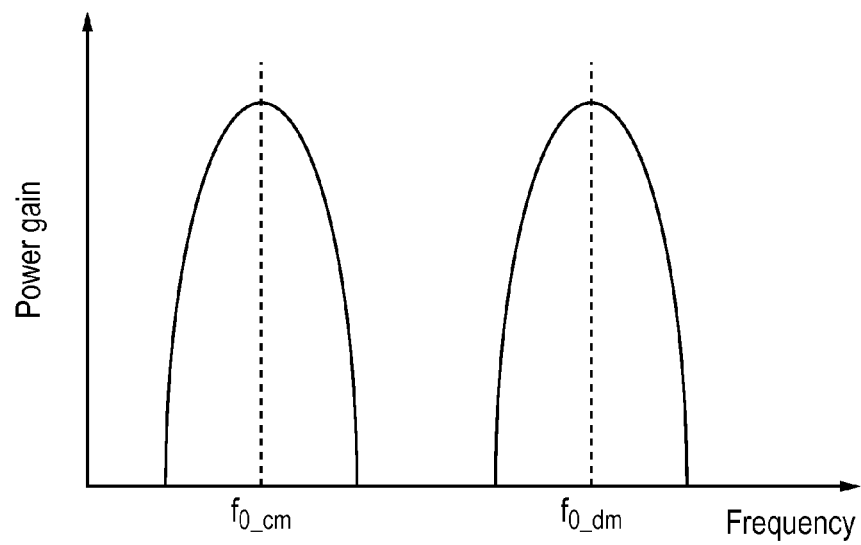
FIG. 3 depicts the power gain of the RF front-end according to the invention.

FIG. 2 shows a more detailed picture of the RF front-end. It consists of two amplifiers 3,4), an input matching network (1) for the common mode input impedance and the differential mode input impedance, an output matching network (2) for the common mode and differential mode output impedance, and two phase shifters (5,6) implemented as transmission lines. The phase shifters (5,6) may be implemented in several ways, for example with lumped components, passive all-pass filters, etc. The transmission lines (5,6) have an electrical length β1 equal to 180 degrees at f0_cm, and an electrical length of 360 degrees at f0_dm. If in the differential mode the amplifiers' input and output impedances are matched at f0_dm and the amplifiers common mode input and output impedance is matched at f0_cm, the power gain can be as in is shown in FIG. 3.

It can be shown that two sets of requirements need to be fulfilled in order to have power gain at a frequencies $f_{0\_cm}$ and $f_{0\_cm}$:
1. The phase shift of the phase shifters (5,6) must be an odd multiple of 180 degrees at frequency $f_{0\_cm}$ and an even multiple of 180 degrees at frequency $f_{0\_dm}$;
2. The common mode input and output impedance must be matched at frequency $f_{0\_cm}$.
The differential mode input and output impedance must be matched at frequency $f_{0\_dm}$.

The first and the second of the above mentioned requirements can even be met at more than two frequencies, leading to a multiband amplifier. In this embodiment the first requirement is naturally fulfilled at multiple frequencies due to the natural phase behaviour of the transmission lines as a function of frequency. In this embodiment, the second requirement of having an impedance match for the common and differential mode input and output impedance is fulfilled only at $f_{0\_cm}$ and $f_{0\_dm}$ respectively. This is a consequence of the low complexity of the matching network, which are T's of inductors. The matching network components L1, L2, L3 and L4 in FIG. 2 can be chosen by using the formulas below.

$$f_{0,dm} = \frac{1}{2\pi\sqrt{L_1 C_{in}}}$$

$$f_{0,dm} = \frac{1}{2\pi\sqrt{L_3 C_{out}}}$$

$$f_{0,cm} = \frac{1}{2\pi\sqrt{L_1 C_{in} + 2L_2 C_{in}}}$$

$$f_{0,cm} = \frac{1}{2\pi\sqrt{L_3 C_{out} + 2L_4 C_{out}}}$$

The embodiment presented above is just one of many implementation options. The phase shifters (5,6) and matching networks (1,2) can be implemented in several alternative ways. For example, the order of complexity of the matching network can be increased to allow for multiband impedance matching. The matching networks (1,2) could also be implemented using distributed elements instead of lumped elements or using a combination thereof. Also the phase shifters (5,6) can be implemented in different ways. In some situations e.g. at low frequencies the use of phase shifters using lumped components can be beneficial to save area. Active phase shifters can also be used. It is very important that the phase shift is either an even or an odd multiple of 180 degrees and that the impedance matching frequency for the common mode(s) corresponds with the frequency where the phase shift of the phase shifters is an odd multiple of 180 degrees while it is an even multiple of 180 degrees at frequencie(s) where the amplifier is impedance matched for the differential mode.

Figure 4:
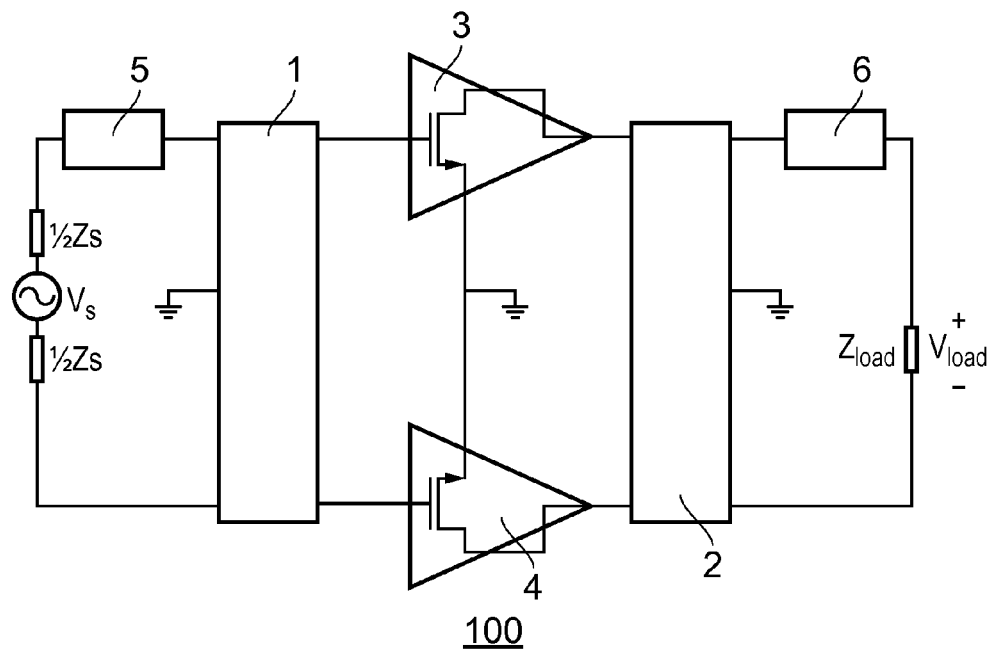
FIG. 4 depicts another embodiment of the RF front-end according to the invention.

FIG. 4 depicts another embodiment of the RF front-end according to the invention. It can be seen that each of the amplifiers 3,4 can be single ended or differential as it was already shown in FIG. 1 or 2. The first amplifier and the second amplifier might be transconductance amplifiers. In the very simple form the amplifiers could be a transistor made in any technology as e.g. bipolar, GaAs or, in general, a III-V compound, CMOS etc. However, depending on the application the amplifiers may be transimpedance amplifier and more general any type of controlled sources.

Even more, when they are implemented as single transistor amplifiers they may be connected as common base (gate) or emitter (source) follower, too.

Figure 5:
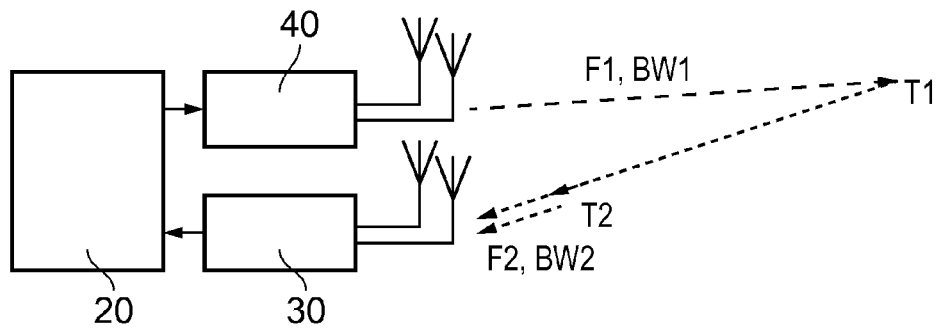
FIG. 5 depicts a radar system using the RF front-end according to the invention.

FIG. 5 depicts a radar system using the RF front-end according to the invention. To be more precise, the embodiment refers to a low cost Multi Band Radar Transceiver.

This system consists of a Radar Transmitter plus Receiver that is capable of emitting and receiving a series of continuous wave frequency chirps or pulses in two frequency bands F1 and F2 with frequency bandwidths BW1 and BW2.

The transmitter and receiver blocks are connected to a radar signal controller/processor block. This block generates the radar pulses chirps and derives the range, velocity and angle of multiple targets from the time of flight and phase relations of the reflected signals.

This Multiband Radar system offers the following advantages compared to a conventional Single band Radar system:

The Frequency and Bandwidth may be optimized as function of the detection requirements i.e.
Long Distance, Moderate Resolution: Low Frequency, Narrow Bandwidth.
Short Distance, High Resolution: High Frequency, Large Bandwidth.
Resolution and Bandwidth are related according to: ΔR=c/(2.BW), wherein c is the speed of light and BW is the frequency bandwidth. The relation between Range and Frequency/Bandwidth is complex; the detection range typically decreases for higher frequency and larger bandwidth.

Concurrent multiband operation enables a smooth frequency transition of detected targets depending upon their distance and required resolution.

Concurrent operation in multiple frequency bands increases the rate at which information from the targets is detected and therefore decreases the response time of the system.

Multiband operation according to this application saves system cost by re-use of the transceiver and antenna hardware.

Figure 6:
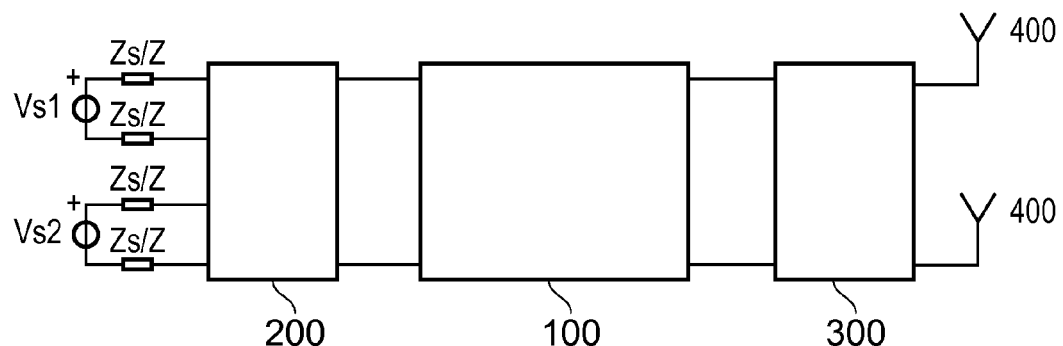
FIG. 6 depicts a radar receiver, according to the invention.

FIG. 6 shows an example of a Dual-Band Radar Transmitter according to this invention. The transmitter generates two frequency chirps at the same time: one chirp in the 76-81 GHz band with a limited bandwidth of 0.5 GHz for long range detection with limited resolution and another chirp in the 115-125 GHz band with 5 GHz bandwidth for high resolution detection with limited range.

The signals are combined at the input of the multiband amplifier in a Signal (300) Combiner. The signals are split at the output of the amplifier in a Signal Splitter (200) and fed to two Single-Band antennae 400 that are each designed to radiate power in one of the target frequency bands.

Figure 7:
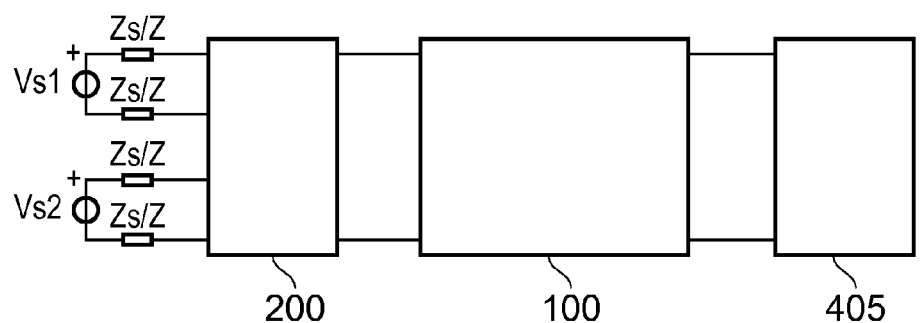
FIG. 7 depicts another radar receiver, according to the invention.

FIG. 7 shows an alternative of the concept presented in FIG. 6. In this case the signals at the output of the amplifier are fed into a Dual-Band antenna designed to radiate power in two frequency bands and shown together with the output splitter as block 405.

A multiband receiver would comprise the same main building blocks as the transmitter, but in a different order. A Dual-Band Radar Receiver according to this invention would be able to receive two frequency chirps at the same time: one chirp in the 76-81 GHz band with a limited bandwidth of 0.5 GHz for long range detection with limited resolution and another chirp in the 115-125 GHz band with 5 GHz bandwidth for high resolution detection with limited range.

The signals are received by two single-band antennae and combined at the input of the multiband amplifier in a Signal Combiner. The signals are split at the output of the amplifier by use of a Signal Splitter and fed to two Single-Band receiver outputs for further signal processing.

Figure 8:
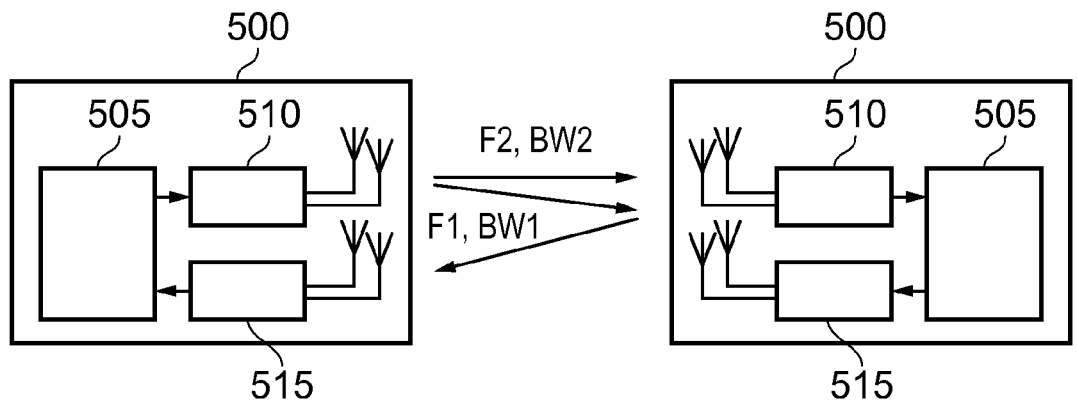
FIG. 8 depicts a system comprising at least two RF front-ends, according to the invention.

Alternatively, the signals are received by a Dual-Band antenna which is designed to receive power in two frequency bands this way eliminating the need for a signal combiner at the input In another embodiment of the invention the RF front-end can be used in a low cost Radar plus Point to Point Communication system as shown in FIG. 8. This system consists of a transmitter plus receiver that is capable of emitting and receiving a series of continuous wave frequency chirps or pulses in frequency band F1 with bandwidths BW1 and a communication signal in frequency band F2 with bandwidth BW2.

The transmitter and receiver blocks are connected to a radar plus communication signal controller/processor block. This block generates the radar pulses/chirps and derives the range, velocity and angle of multiple targets from the time of flight and phase relations of the reflected signals and it generates and detects the communication signals.

This combined Radar/Communication system offers the following advantages compared to a conventional Radar plus Communication system:
  It enables simultaneous detection and communication of/to objects in a particular angular direction. One example is a Car Radar/Intelligent Traffic System (ITS) Communication system in which ITS messages are exchanged using point to point communication between Cars be sending and receiving data in a specific spatial direction measured by the Radar system. This form of Spatial Re-use of the frequency spectrum avoids the problem of the limited system capacity of conventional non-directional ITS communication systems.
  Combining Radar plus Communication functions according to this invention saves system cost by re-use of the transceiver and antenna hardware.

Figure 9:
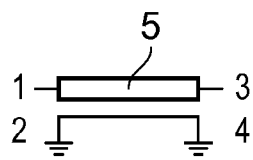
FIG. 9 depicts a layout of a transmission line, according to the invention.
Figure 9:
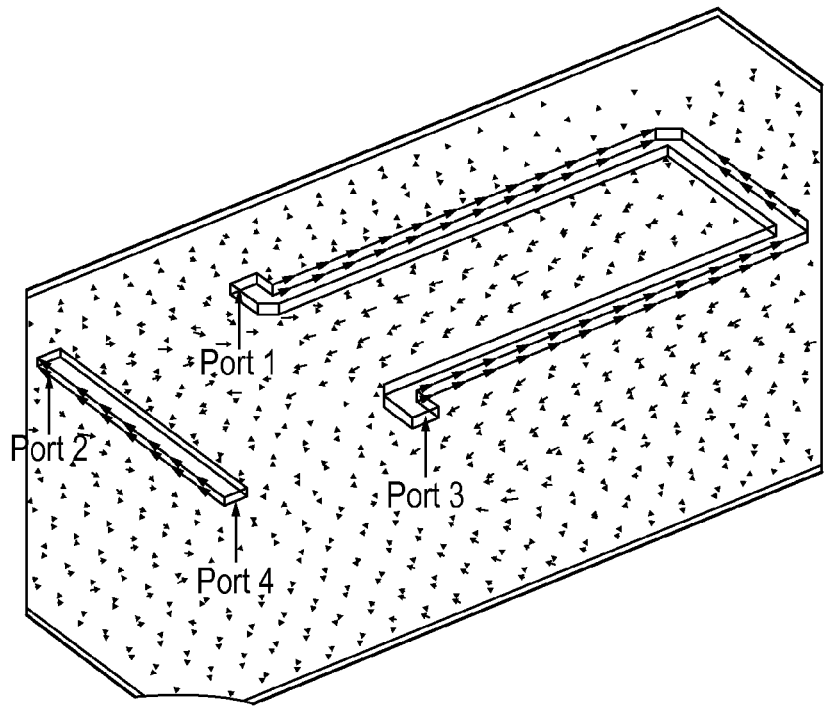

FIG. 9 depicts a layout of a transmission line, according to the invention. The network consists of two uncoupled single-ended transmission lines with a different electrical length. The connection points in the drawing of the phase shifter (5) correspond to that of the layout description. It is further remarked that the total electrical length is important for determining the phase shift but the actual geometry is less important to that.

It is remarked that the scope of protection of the invention is not restricted to the embodiments described herein. Neither is the scope of protection of the invention restricted by the reference numerals in the claims. The word "comprising" does not exclude other parts than those mentioned in the claims. The word "a(n)" preceding an element does not exclude a plurality of those elements. Means forming part of the invention may both be implemented in the form of dedicated hardware or in the form of a programmed purpose processor. The invention resides in each new feature or combination of features.

The invention claimed is:

1. An RF front-end adapted to receive or transmit signals located in at least two separated frequency bands, comprising an input and an output and further comprising
  a first phase shifter coupled to the input of the RF front-end;
  a second phase shifter coupled to the output of the RF front-end;
  the first phase shifter being coupled to the second phase shifter via a first amplifier and second amplifier, respectively.

2. An RF front-end as claimed in claim 1, further comprising an input matching circuit comprising a first input coupled to the input of the RF front-end and a second input coupled to the first phase shifter, the first matching circuit further comprising a first output coupled to an input of the first amplifier circuit and a second output coupled to an input of the second amplifier circuit.

3. An RF front-end as claimed in claim 1, further comprising an output matching circuit comprising a third input coupled to an output of the first amplifier circuit, and a fourth input coupled to an output of the second amplifier circuit.

4. An RF front-end as claimed in claim 1, wherein the first phase shifter has the same structure as the second phase shifter.

5. An RF front-end as claimed in claim 1, wherein the input matching circuit has the same structure as the output matching circuit.

6. An RF front-end as claimed in claim 1, wherein the first phase shifter and the second phase shifter each comprises a delay line or a lumped passive or active filter.

7. An RF front-end as claimed in claim 1, wherein the first phase shifter and the second phase shifter each provides at their respective outputs an odd multiple of 180° phase shift of a signal situated in a first frequency band applied to their respective inputs.

8. An RF front-end as claimed in claim 1, wherein the first phase shifter and the second phase shifter each provides at their respective outputs an even multiple of 180° phase shift of a signal situated in a second frequency band applied to their respective inputs.

9. An RF front-end as claimed in claim 1, wherein the input matching circuit comprises a T filter comprising inductors.

10. An RF front-end as claimed in claim 1, wherein the output matching circuit comprises a T filter comprising inductors.

11. An RF front-end as claimed in claim 1, wherein the first amplifier and the second amplifier are single-ended or differential amplifiers.

12. An RF front-end as claimed in claim 1, wherein the first amplifier and the second amplifier are transconductace amplifiers.

13. An RF front-end as claimed in claim 1, wherein the first amplifier and the second amplifier are transistors amplifiers.

14. A transmitter comprising a signal combiner coupled to an RF front-end as claimed in claim 1, the RF front-end being coupled to a signal splitter, the signal splitter being coupled to either a pair of single band antenna, or to a dual band antenna.

15. A receiver comprising a signal combiner coupled to an RF front-end as claimed in claim 1, the RF front-end being coupled to a signal splitter, the signal combiner being coupled to either a pair of single band antenna, or to a dual band antenna.

16. A communication system comprising at least a pair of communication devices each comprising a transmitter comprising a signal combiner coupled to an RF front-end as claimed in claim 1, the RF front-end being coupled to a signal splitter, the signal splitter being coupled to either a pair of single band antenna, or to a dual band antenna and a receiver as claimed in claim 15.

17. A radar system comprising a transmitter comprising a signal combiner coupled to an RF front-end as claimed in claim 1, the RF front-end being coupled to a signal splitter, the signal splitter being coupled to either a pair of single band antenna, or to a dual band antenna and/or a receiver as claimed in claim 15.

18. A car comprising a radar system as claimed in claim 17.

19. A communication system comprising at least a pair of communication devices as claimed in claim 16, each of the communication devices being mounted on a respective car.

* * * * *